United States Patent
Chin et al.

(10) Patent No.: US 9,875,469 B1
(45) Date of Patent: Jan. 23, 2018

(54) BILL SPLITTING

(71) Applicant: SQUARE, INC., San Francisco, CA (US)

(72) Inventors: Andrew Chin, San Francisco, CA (US); Dan Seeman, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 152 days.

(21) Appl. No.: 14/140,212

(22) Filed: Dec. 24, 2013

(51) Int. Cl.
*G06Q 20/00* (2012.01)
*G06Q 20/32* (2012.01)
*G06Q 20/14* (2012.01)
*G06Q 20/10* (2012.01)
*G06Q 20/20* (2012.01)

(52) U.S. Cl.
CPC ......... *G06Q 20/14* (2013.01); *G06Q 20/3276* (2013.01); *G06Q 20/102* (2013.01); *G06Q 20/20* (2013.01); *G06Q 20/322* (2013.01)

(58) Field of Classification Search
CPC .... G06Q 20/14; G06Q 20/102; G06Q 20/322; G06Q 20/3276; G06Q 20/20
USPC .......................................................... 705/40
See application file for complete search history.

(56) References Cited

U.S. PATENT DOCUMENTS

| | | | |
|---|---|---|---|
| 5,844,572 A | 12/1998 | Schott | |
| 8,020,763 B1 | 9/2011 | Kowalchyk et al. | |
| 9,576,284 B2* | 2/2017 | Runyan | G06Q 20/3224 |
| 2003/0115095 A1 | 6/2003 | Yamauchi | |
| 2004/0248548 A1 | 12/2004 | Niwa et al. | |
| 2006/0229984 A1* | 10/2006 | Miyuki | G06Q 20/102 |
| | | | 705/40 |
| 2006/0282660 A1 | 12/2006 | Varghese et al. | |
| 2009/0299869 A1* | 12/2009 | Cibanof | G06Q 20/102 |
| | | | 705/26.1 |
| 2010/0082481 A1 | 4/2010 | Lin et al. | |
| 2010/0121745 A1* | 5/2010 | Teckchandani | G06Q 10/00 |
| | | | 705/30 |
| 2010/0280860 A1 | 11/2010 | Iskold et al. | |

(Continued)

OTHER PUBLICATIONS

"Tab: A Seriously Useful Bill-Splitting App", Aug. 27, 2013, The Huffington Post, Accessed on Sep. 6, 2017, <http://www.huffingtonpost.com/2013/08/27/bill-splitting-app-tab_n_3818225.html>.*

(Continued)

*Primary Examiner* — Eric T Wong
*Assistant Examiner* — Joshua D. Bradley
(74) *Attorney, Agent, or Firm* — Polsinelli PC (57) ABSTRACT

When a merchant sells goods or services in a sales transaction, a merchant device can generate a bill. The bill includes an itemized list of the goods and services, a price for each item, and an identifier of the sales transaction. A first customer and a second customer split the bill using a first customer device and a second customer device, respectively. The first customer device establishes communication between the first customer device and the merchant device. Using the identifier of the sales transaction, the first customer device pays a portion of the itemized list of the goods and services at the merchant device. The second customer device establishes communication between the second customer device and the merchant device. Using the identifier, the second customer device pays a remaining portion of the itemized list of the goods and services at the merchant device.

29 Claims, 8 Drawing Sheets

(56) References Cited

U.S. PATENT DOCUMENTS

| | | | |
|---|---|---|---|
| 2011/0145049 A1* | 6/2011 | Hertel | G06Q 20/02 705/14.23 |
| 2011/0178883 A1 | 7/2011 | Granbery et al. | |
| 2011/0238517 A1 | 9/2011 | Ramalingam et al. | |
| 2011/0251892 A1 | 10/2011 | Laracey | |
| 2011/0283188 A1 | 11/2011 | Farrenkopf et al. | |
| 2011/0307282 A1 | 12/2011 | Camp et al. | |
| 2011/0313871 A1 | 12/2011 | Greenwood | |
| 2012/0130903 A1 | 5/2012 | Dorsey et al. | |
| 2012/0166332 A1 | 6/2012 | Naaman | |
| 2012/0173396 A1* | 7/2012 | Melby | G06Q 30/04 705/34 |
| 2012/0185355 A1* | 7/2012 | Kilroy | G06Q 30/0633 705/26.8 |
| 2012/0209749 A1* | 8/2012 | Hammad | G06Q 30/06 705/27.1 |
| 2012/0265676 A1 | 10/2012 | Gould et al. | |
| 2013/0006853 A1* | 1/2013 | Amundsen | G06Q 40/00 705/40 |
| 2013/0041824 A1* | 2/2013 | Gupta | G06Q 40/00 705/44 |
| 2013/0132274 A1 | 5/2013 | Henderson et al. | |
| 2013/0246220 A1 | 9/2013 | Hammad et al. | |
| 2013/0290040 A1 | 10/2013 | Perry et al. | |
| 2013/0317893 A1 | 11/2013 | Nelson et al. | |
| 2014/0074691 A1* | 3/2014 | Bank | G06Q 20/3278 705/39 |
| 2014/0100931 A1* | 4/2014 | Sanchez | G06Q 20/40 705/14.23 |
| 2014/0156508 A1* | 6/2014 | Argue | G06Q 20/32 705/39 |
| 2014/0156517 A1* | 6/2014 | Argue | G07G 1/0081 705/40 |
| 2014/0164234 A1* | 6/2014 | Coffman | G06Q 20/14 705/40 |
| 2014/0180929 A1* | 6/2014 | Ohnishi | G06Q 20/38215 705/64 |
| 2014/0214652 A1* | 7/2014 | Zheng | G06Q 20/227 705/39 |
| 2014/0222663 A1* | 8/2014 | Park | G06Q 20/29 705/39 |
| 2014/0279098 A1* | 9/2014 | Ham | G06Q 20/102 705/16 |
| 2014/0351130 A1* | 11/2014 | Cheek | G06Q 20/29 705/44 |
| 2015/0287006 A1 | 10/2015 | Hunter et al. | |

OTHER PUBLICATIONS

Divvy App Website, "Divvy makes splitting the check as easy as snap, drag, and pay", Accessed via the Wayback Machine on Sep. 6, 2017 as the webpage appeared on May 11, 2013, <http://divvythatup.com/>.*
U.S. Appl. No. 13/649,603, filed Oct. 11, 2012, Cardless Payment Transactions with Multiple Users, Kumar.
Goode, Lauren. *Paying With Square's New Mobile-Payments App*. All Things D. Published Apr. 30, 2012. Retrieved on Nov. 7, 2014. Retrieved from the Internet: URL<http://allthingsd.com/20120430/paying-with-squares-new-mobile-payments-app/>. 3 pages.
*Splitwise*. Splitwise. Last updated Nov. 4, 2014. Retrieved from the internet on Nov. 4, 2014. Retrieved from the internet: URL<https://www.splitwise.com/>. 2 pages.
*Splitwise*. Google Play. Last updated Oct. 15, 2014. Retrieved from the internet on Nov. 4, 2014. Retrieved from the internet: URL<https://play.google.com/store/apps/details?id=com.Splitwise.SplitwiseMobile>. 2 pages.
*Splitabill*. Splitabill. Last updated Nov. 4, 2014. Retrieved from the internet on Nov. 4, 2014. Retrieved from the internet: URL<https://splitabill.com/tour/>. 2 pages.
*Splitabill*. iTunes Preview. Last updated Oct. 15, 2012. Retrieved from the internet on Nov. 4, 2014. Retrieved from the internet: URL<https://itunes.apple.com/us/app/splitabill/id485048203>. 2 pages.
*Billr*. Billr. Last updated Oct. 16, 2013. Retrieved from the internet on Nov. 4, 2014. Retrieved from the internet: URL<http://billr.me/>. 4 pages.
*Billr*. iTunes Preview. Last updated Nov. 3, 2012. Retrieved from the internet on Nov. 4, 2014. Retrieved from the internet: URL<https://itunes.apple.com/us/app/billr-bill-splitting-at-table/id501889312?ls=1&mt=8>. 2 pages.
*Divvy That Up*. Divvy That Up. Last updated Sep. 17, 2013. Retrieved from the internet on Nov. 4, 2014. Retrieved from the internet: URL<http://www.divvythatup.com/>. 5 pages.
*Divvy*. iTunes. Last updated Sep. 26, 2013. Retrieved from the internet on Nov. 4, 2014. Retrieved from the internet: URL<https://itunes.apple.com/us/app/divvy/id560503890?ls=1&mt=8>. 2 pages.
*DapShare*. dapShare. Last updated Nov. 4, 2014. Retrieved from the internet on Nov. 4, 2014. Retrieved from the internet: URL<http://dapshare.com/>. 2 pages.
*DapShare*. Google Play. Last updated Nov. 23, 2011. Retrieved from the internet on Nov. 4, 2014. Retrieved from the internet: URL<https://play.google.com/store/apps/details?id=com.dapshare&hl=en>. 2 pages.
*WeSplit.It*. WeSplit.It. Last updated Nov. 4, 2014. Retrieved from the internet on Nov. 4, 2014. Retrieved from the internet: URL<https://wesplit.it/>. 2 pages.
Final Office Action dated May 19, 2016, for U.S. Appl. No. 13/925,683, of Clark, C., et al., filed Jun. 24, 2013.
Final Office Action dated Jul. 21, 2016, for U.S. Appl. No. 13/649,603, of Kumar, A., filed Oct. 11, 2012.
Final Office Action dated May 18, 2017, for U.S. Appl. No. 13/925,683, of Clark, C., et al., filed Jun. 24, 2013.
Non-Final Office Action dated Jun. 7, 2017, for U.S. Appl. No. 14/664,766, of Ng, A.Y., et al., filed Mar. 20, 2015.
Non-Final Office Action dated Oct. 18, 2016, for U.S. Appl. No. 13/925,683, of Clark, C., et al., filed Jun. 24, 2013.
Notice of Allowance dated Jan. 26, 2017, for U.S. Appl. No. 13/649,603, of Kumar, A., filed Oct. 11, 2012.
Non-Final Office Action dated Feb. 10, 2017, for U.S. Appl. No. 14/569,451, of Abrams, Z.C., et al., filed Dec. 12, 2014.
Non-Final Office Action dated Jun. 11, 2013, for U.S. Appl. No. 13/649,603, of Kumar, A., filed Oct. 11, 2012.
Final Office Action dated Dec. 5, 2013, for U.S. Appl. No. 13/649,603, of Kumar, A., filed Oct. 11, 2012.
Non-Final Office Action dated Oct. 14, 2014, for U.S. Appl. No. 13/925,683, of Clark, C., et al., filed Jun. 24, 2013.
Non-Final Office Action dated Jan. 28, 2015, for U.S. Appl. No. 13/649,603, of Kumar, A., filed Oct. 11, 2012.
Final Office Action dated May 13, 2015, for U.S. Appl. No. 13/925,683, of Clark, C., et al., filed Jun. 24, 2013.
Final Office Action dated Oct. 16, 2015, for U.S. Appl. No. 13/649,603, of Kumar, A., filed Oct. 11, 2012.
Non-Final Office Action dated Nov. 17, 2015, for U.S. Appl. No. 13/925,683, of Clark, C., et al., filed Jun. 24, 2013.
Advisory Action dated Dec. 14, 2015, for U.S. Appl. No. 13/649,603, of Kumar, A., filed Oct. 11, 2012.
Non-Final Office Action dated Feb. 25, 2016, for U.S. Appl. No. 13/649,603, of Kumar, A., filed Oct. 11, 2012.
Final Office Action dated Aug. 25, 2017, for U.S. Appl. No. 14/569,451, of Abrams, Z.C., et al., filed Dec. 12, 2014.
Final Office Action dated Sep. 14, 2017, for U.S. Appl. No. 14/664,766, of Ng, A.Y., et al., filed Mar. 20, 2015.

* cited by examiner

BILL SPLITTING

BACKGROUND

This disclosure relates to payment processing.

In a sales transaction where goods or services are sold for money, more than one party may pay the money for the goods and services. For example, when a group of people eat at a restaurant, the group of people may split the bill, where each person in the group pays a portion of the bill. Conventionally, when the group people receive a bill, the group of people may divide the bill evenly among each member of the group. Alternatively, each member of the group may identify the item or items that the member ordered, and pay only for that item or those items. In the former case, a person in the group may pay too much or too little for what the person ordered. In the latter case, each person in the group may need to calculate a subtotal amount for that person, tax on the subtotal, and the person's share on gratuity. When the group is large, the dividing the bill can be confusing.

BRIEF DESCRIPTION OF THE DRAWINGS

Like reference numbers and designations in the various drawings indicate like elements.

DETAILED DESCRIPTION

When a merchant sells goods or services in a sales transaction, a merchant device can generate a bill. The bill includes an itemized list of the goods and services, a price for each item, and an identifier of the sales transaction. A first customer and a second customer split the bill using a first customer device and a second customer device, respectively. The first customer device establishes communication between the first customer device and the merchant device. Using the identifier of the sales transaction, the first customer device pays a portion of the itemized list of the goods and services at the merchant device. The second customer device establishes communication between the second customer device and the merchant device. Using the identifier, the second customer device pays a remaining portion of the itemized list of the goods and services at the merchant device.

The features described in this specification can be implemented to achieve one or more advantages. For example, one customer can invite other customers to join a payment transaction. Multiple customers can participate in a point-of-sale electronic payment transaction with a merchant without calculating each customer's share. In addition, the customers can conduct the transaction without physically presenting a credit card. Merchants can be provided with one bill for a payment transaction from a payment service system even if multiple customers pay individually.

The details of one or more implementations of bill splitting techniques are set forth in the accompanying drawings and the description below. Other features, aspects, and advantages of the techniques will become apparent from the description, the drawings, and the claims.

Figure 1:
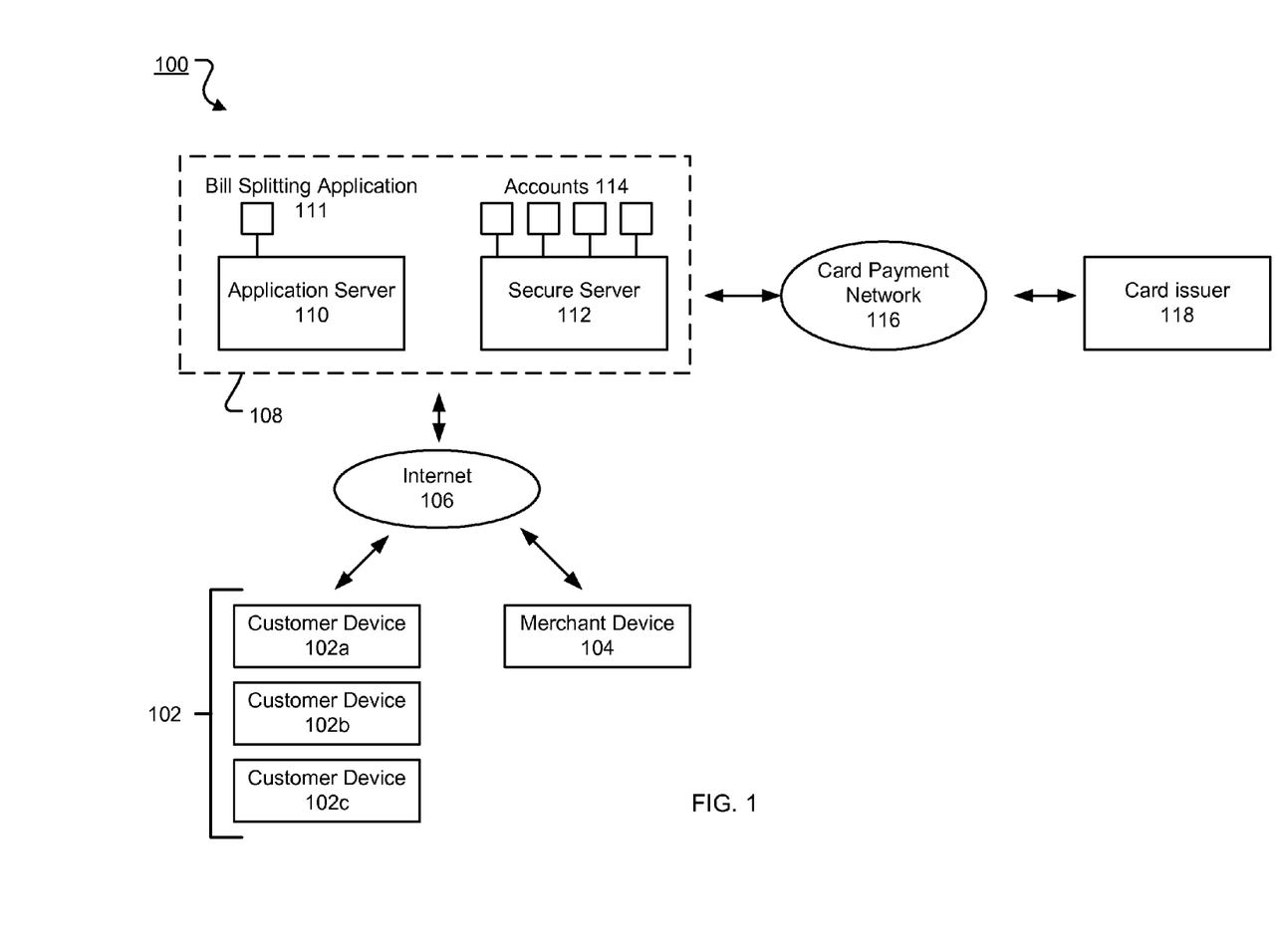
FIG. 1 is a schematic illustration of an example payment system architecture.

FIG. 1 is a schematic illustration of the architecture of an example payment system 100. The overall system 100 includes multiple customer devices 102 and a merchant device 104. Each customer device 102, as well as the merchant device 102, is connected to a network 106, e.g., the Internet. In general, there is one customer device per customer who will join in a payment transaction. Although FIG. 1 illustrates three customer devices 102a, 102b, 102c, there could be just two customer devices, or four or more customer devices. Each customer device 102 is a mobile computing device, e.g., a smartphone, a tablet computer, or a wearable computing device. Each customer device 102 is configured to execute a customer application, e.g., a digital wallet application program. The merchant device 104 is a computing device configured to execute a merchant application, e.g., a cashier application program. The merchant device 104 can be a mobile device, a desktop computer, a laptop computer, a dedicated point of sale system, or other data processing apparatus.

A payment processor operates a payment service system 108. The customer and merchant devices can communicate with the payment service system 108 using the network 106. The payment service system 108 includes an application server 110 and a secure server 112 to process transactions between each customer device 102 and the merchant device 104. In general, the application server 110 handles non-secure information. For example, the application server 110 can store public merchant information such as the merchant's address or phone number. The application server 110 can also be responsible for transferring a customer application to, or updating the customer application on, each customer device 102. Likewise, application server 110 can be responsible for transferring the merchant application, e.g., a bill splitting application 111, to, or updating the merchant application on, the merchant device 104. In particular, the application server 110 can be responsible for sending information about merchants that have accounts with the payment system to each customer device 102. The secure server 112 handles secure information such as credit card numbers, debit card numbers, bank accounts, customer accounts, customer identifying information or other sensitive information.

The payment service system 108 can communicate with a computer system 116 of a card payment network, e.g., Visa™ or MasterCard™. The payment service system 108 can communicate with a computer system of the card payment network 116 over the network 106 or over a different network. The computer systems of the card payment network 116 can communicate in turn with a computer system 118 of a card issuer, e.g., a bank. There can also be computer systems of other entities, e.g., the card acquirer, between the payment service system 108 and the card issuer.

Before a transaction between each customer and the merchant can be performed using the cardless payment system, each customer creates a customer account with the payment service system 108 and the merchant creates a merchant account with the payment service system 108.

A customer, e.g., an owner of a customer device 102a, 102b, or 102c, can sign up using a mobile application or using an online website. Prior to the transaction, a customer application is downloaded to the customer device 102, e.g., through an application store. Creation of the customer account can be handled through the customer application, or through another application, e.g., a generic web browser. The customer enters a name, account password, and contact information, e.g., email address. Before a transaction can be performed, the customer also enters financial account information sufficient to conduct the transaction into the payment service system 108. For example, in the case of a credit card account, the customer can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the customer before a transaction can be performed. The photo of the customer would be provided to the merchant so that the merchant can compare the photo to the person. In addition, the payment service system 108 can require a personal identification number (PIN) be entered by the customer. Other requirements can also be added to increase security. The data associated with an account 114, e.g., a customer account, can be stored at the secure server 112, e.g., in a database.

If the customer is signing up with a mobile application, the customer's financial account information can be entered by swiping the financial transaction card through a slot of a card reader coupled to the mobile device. Alternatively, the customer can enter in financial account information by typing in information at the customer device 102, selecting a card from an application on the mobile device, from an online entity, or others. In some implementations, another external application generates a receipt that is sent to the customer. The receipt then includes a hypertext link that allows a customer to create a customer account in the cardless payment system. For example, activating the link in the receipt can automatically create a customer account with the financial account information prefilled based on the card used in the receipt to reduce effort by the customer. In effect, activating a new account using a receipt auto-verifies the customer into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with an account 114, e.g., a merchant account, can be stored at the secure server 112, e.g., in a database.

At some point prior to the transaction, a merchant application is downloaded to the merchant device 104, e.g., through an application store. Creation of the merchant account can be handled through the merchant application, or through another application, e.g., a generic web browser. The merchant application can include functions for splitting a bill between multiple customer devices 102a through 102c.

Eventually, in order to receive funds from the transaction, the merchant will need to enter financial account information into the payment service system sufficient to receive funds. For example, in the case of a bank account, the customer can enter the bank account number and routing number. However, the merchant's financial account can also be associated with a credit card account or another third party financial account. In addition, in some implementations, if the merchant has not entered the financial account information, the payment processor can hold the received funds until the financial account information is provided.

Figure 2:
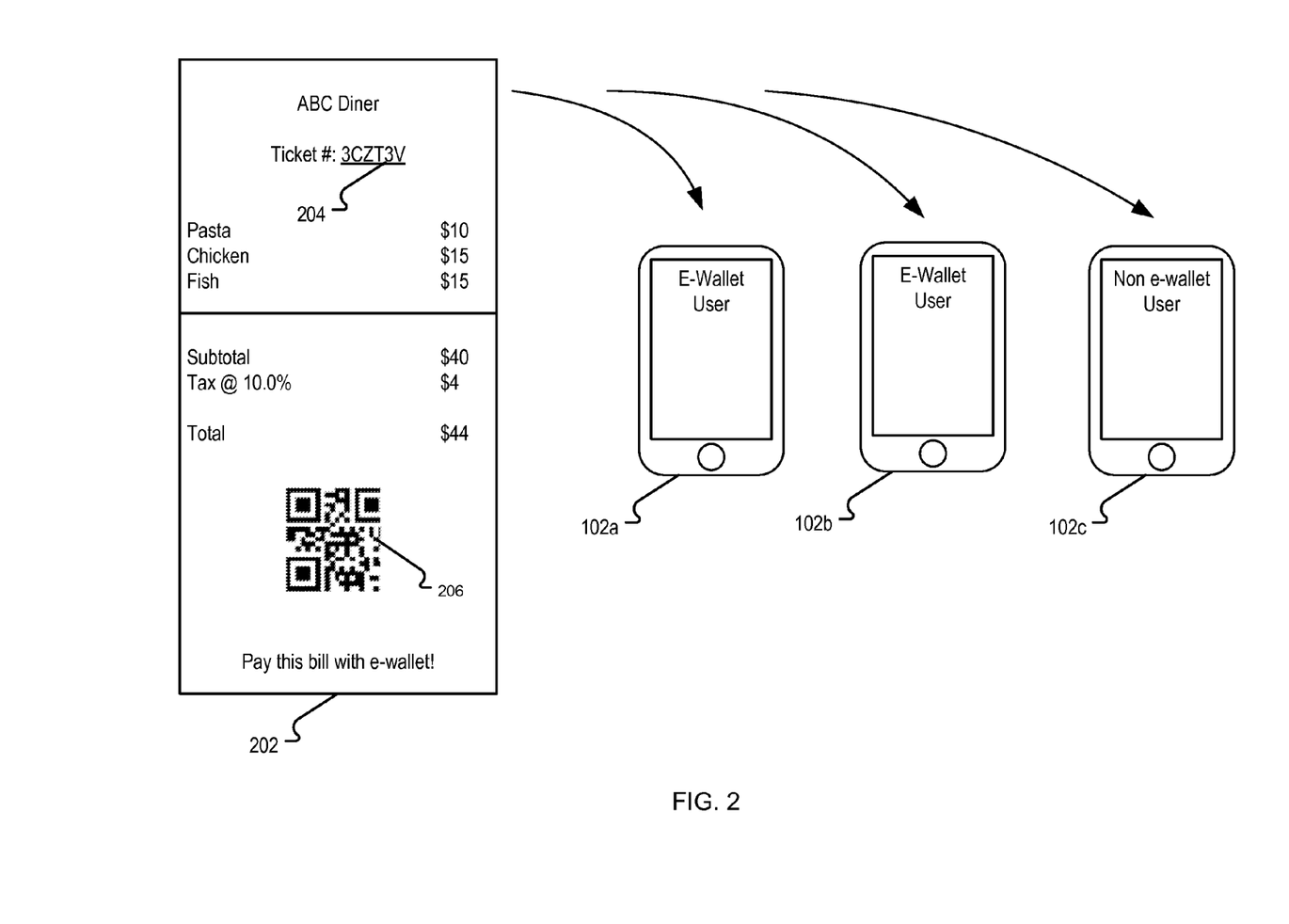
FIG. 2 is a diagram illustrating splitting a bill between three example customer devices.

FIG. 2 is a diagram illustrating splitting a bill between three example customer devices. A merchant can provide goods or services to a group of customers, and provide a bill for the goods or services to at least one of the customers. For example, a restaurant can provide meals to a group of three customers A, B, and C, and presents a bill 202 to the three customers. The bill 202 can be a printed invoice, or an electronic invoice displayed on a display device of a merchant device. In some implementations, a merchant device can push the bill 202 to be displayed on a customer device. The bill 202 includes a list of items the customers bought at the restaurant. The bill 202 includes transaction identifier 204. The transaction identifier 204 is an identifier of the transaction in which the items were bought. The bill 202 includes a representation 206 of the transaction. The representation 206 can include the transaction identifier 204 encoded in various forms, and, optionally, details of the bill 202, e.g., name and price of each item, subtotal, tax amount, and total amount. The representation 206 can be a barcode that can be scanned by a customer device. In various implementations, the representation 206 can be a one-dimensional or two-dimensional bar code, e.g., a quick response (QR™) code.

The bill 202 is split among the three customers A, B, and C. To split the bill 202, each of the three customers A, B, and C pays a portion of the bill 202. For example, each of the customers A, B, and C can pay for a respective item that the customer ordered at the restaurant. Customers A, B, and C use customer devices 102a, 102b, and 102c, respectively. In the example shown, each of customer devices 102a and 102b previously downloaded a digital wallet application program for performing financial transactions. The digital wallet application program, when executed, can cause the customer devices 102a, 102b to split the bill 202. The customer device 102c may not have a function to pay bills wirelessly. For convenience, in the example shown, the customer device 102a processes the bill 202 first. The operations of the customer device 102a are described below in reference to FIG. 3.

Figure 3:
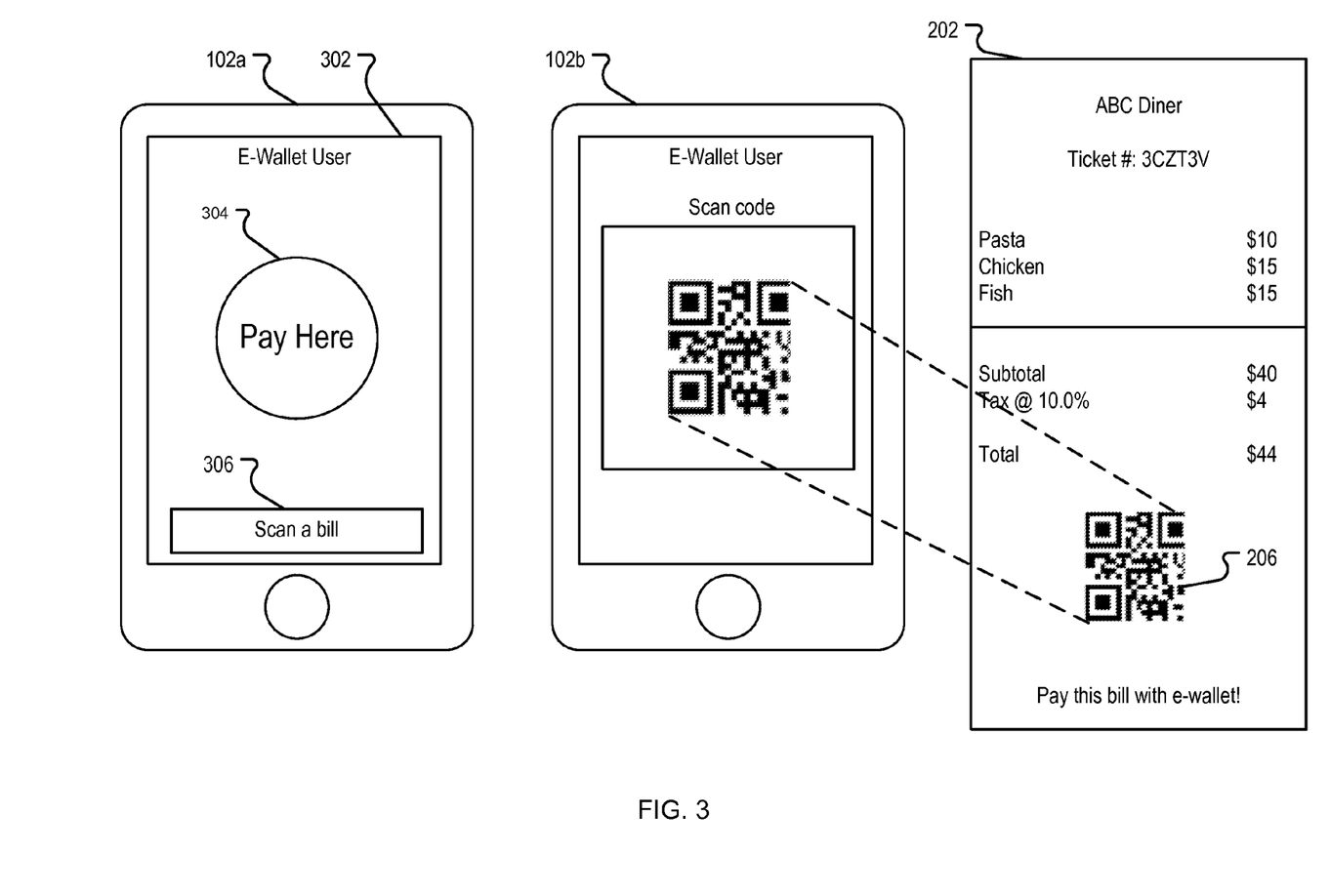
FIG. 3 illustrates an example user interface of a customer device receiving a bill to be split.

FIG. 3 illustrates an example user interface of a customer device 102a receiving a bill to be split. The customer device 102a receives a user input activating a digital wallet program. The digital wallet program causes the customer device 102a to display, on a display device 302, a user interface item 304. The user interface item 304 prompts the user to pay at least a portion of a bill using features of a digital wallet. In addition, the digital wallet program causes the customer device 102a to display a user interface item 306 for scanning a bill.

The customer device 102a receives a user input through the user interface item 306. Upon receiving the user input, the customer device 102a scans the bill 202 using a camera device coupled to the customer device 102a. The customer device 102a can detect the representation 206 of the transaction during the scan.

In some implementations, the representation 206 includes a complete set of information that is sufficient for the digital wallet program to make a payment. The information can include details of the transaction, including the items ordered in the transaction, individual and total prices of the items, tax information, and a merchant identifier for identifying a merchant account.

In some implementations, the representation 206 includes information on how to communicate with a merchant device, and an identifier of the transaction. For example, the representation 206 can include an encoded link to a Web site of the merchant, or encoded information on accessing a wireless network of the merchant. Using this information, and the identifier of the transaction, the customer device 102a can connect to the merchant device and retrieve details of the bill wirelessly. The customer device 102a can display the details and pay for a portion of the bill, as described below in reference to FIG. 4.

Figure 4:
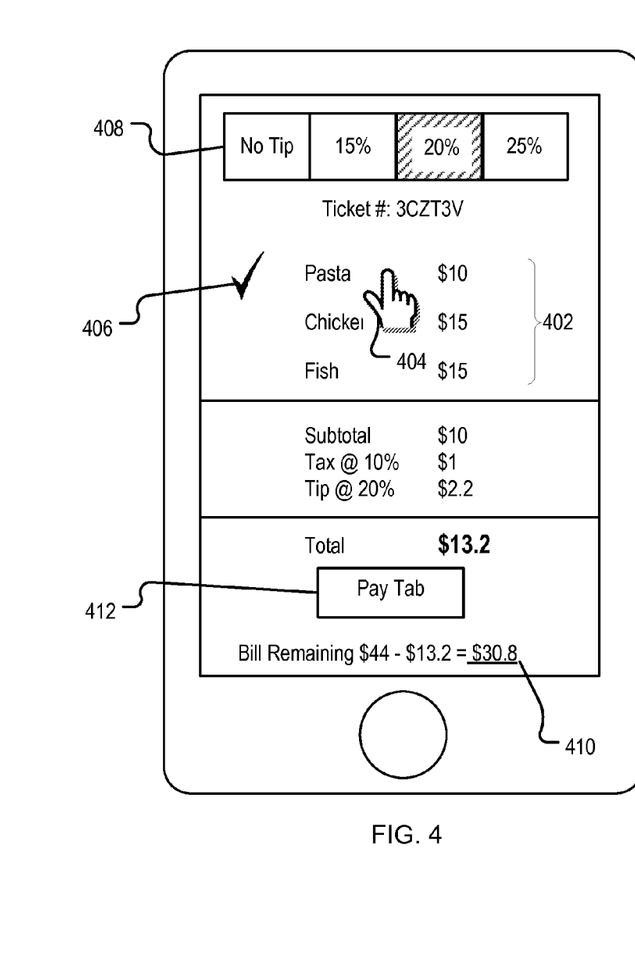
FIG. 4 illustrates an example user interface of a customer device paying a first portion of a bill.

FIG. 4 illustrates an example user interface of a customer device 102a paying a first portion of a bill. The customer device 102a receives details of the bill 202 (of FIG. 2) from a scan of the bill 202 or from a merchant device. The details include a list of items in the bill, respective prices for each item, and additional information, for example, tax percentage rate and tax amount on each item.

The customer device 102a displays user interface item 402 of the bill 202 on a display screen. The user interface item 402 can include an interactive list of the items in the bill. The interactive list can receive a user input, e.g., a touch input 404, that selects one or more items in the list. Upon receiving an input selecting an item, the customer device 102a can determine that the customer device 102a will be responsible for paying for the selected item or items. The customer device 102a can provide for display an indicator 406, e.g., a check mark or a highlight, indicating that the item will be paid for by a customer through the first customer device 102a.

The customer device 102a can provide for display a gratuity calculator user interface item 408. The gratuity calculator user interface item 408 is configured to receive a user input of specifying an amount of gratuity to be paid in associated with payment of the selected item. The amount of gratuity can be an absolute amount or a percentage. The amount can be presented as a selection, e.g., virtual buttons representing zero percent, 15 percent, 20 percent, etc., respectively.

Upon receiving a selection of a gratuity amount though the gratuity calculator user interface item 408, e.g., "20 percent," The customer device 102a can highlight the selected gratuity amount. The customer device 102a calculates a subtotal amount of the item or items selected for payment, a tax amount based on the subtotal, and a gratuity amount based on the subtotal, or a gratuity amount based on the subtotal and the tax according to the selected gratuity amount. The customer device 102a then determines a total amount for payment by the customer device 102a, and displays the total amount. In addition, the customer device 102a determines a remainder 410 of the bill 202. The remainder indicates other portions of the bill 202 to be paid after the customer device 102a pays the total amount as calculated for the first customer.

The customer device 102a displays a pay portion of bill interface item 412. The pay portion of bill interface item 412 can include a virtual button, or another form or a user interface item, configured to receive a user input for paying the portion of the bill 202 as selected by the user. Upon receiving the user input though the pay portion of bill interface item 412, the customer device 102a communicates with the merchant device or with a financial service to pay the portion of the bill 202 as selected. The customer device 102a, upon completion of the payment, can transfer the remainder of the bill to a next customer device, e.g., the customer device 102b, for paying a second portion of the bill. In various implementations, the customer device 102a can transfer the remainder to the next customer device in various ways. For example, the customer device 102a can transfer information in the original bill, what item has already been paid for, and the amount already paid as a message to a user on a friend list or contact list stored on the customer device 102a. Alternatively, the customer device 102a can submit a link to the merchant device and the identifier of the transaction to the next customer device. The next customer device can then access transaction information on the merchant device through the link. In some implementations, the customer device 102a can notify the merchant device of a user of the next customer device that will be paying a portion of the bill. In some implementations, a user of the customer device 102a can hand a printed bill to a user of the next customer device for a second scan.

Figure 5:
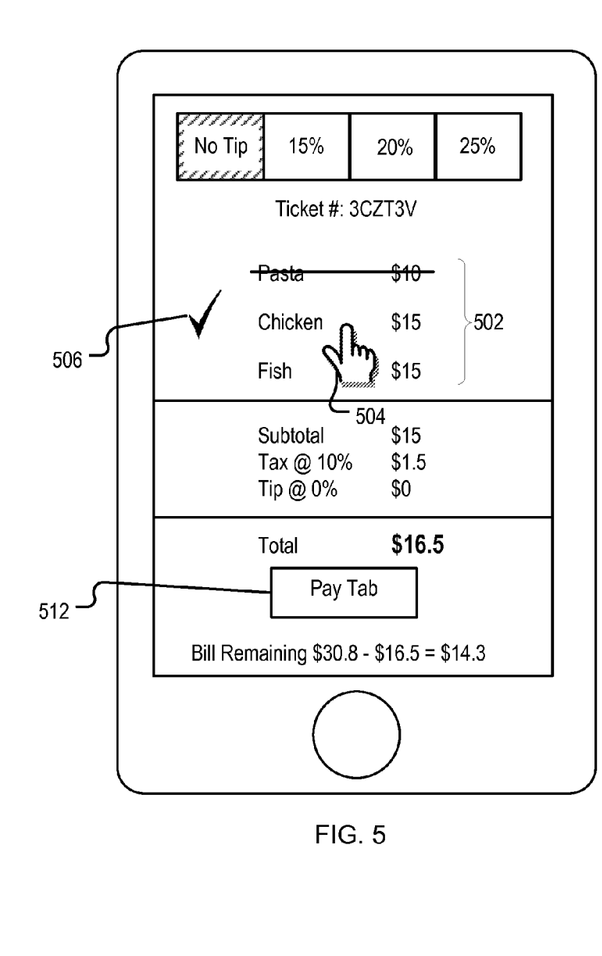
FIG. 5 illustrates an example user interface of a customer device paying a second portion of a bill.

FIG. 5 illustrates an example user interface of a customer device 102b paying a second portion of a bill. The customer device 102b can scan a bill, e.g., the bill 202 of FIG. 2, and retrieve a transaction identifier. The customer device 102b can retrieve the detailed information from the customer device 102a or from the merchant device using the transaction identifier.

The customer device 102b displays user interface item 502 of the bill 202 on a display screen. The user interface item 502 can include an interactive list of the items in the bill. The list includes items already paid for and items that still have not been paid for. For example, a first item "Pasta" has already been paid for by the customer device 102a. Accordingly, the customer device 102b can display an indication that the item is paid for, e.g., by displaying the item in crossed out or greyed out format, and disabling selection of the item. The list can receive a user input, e.g., a touch input 504 on another item that has not been paid for yet. Upon receiving the input selecting the item, the customer device 102b can determine that the customer device 102b will be responsible for paying for the selected item. The customer device 102b can provide for display an indicator 506, e.g., a check mark or a highlight, indicating that the selected item will be paid by the user through the second customer device 102b.

The customer device 102a displays a pay portion of bill interface item 512. Upon receiving the user input though the pay portion of bill interface item 512, the customer device 102b communicates with the merchant device or with a financial service to pay the portion of the bill 202 as selected. The customer device 102b, upon completion of the payment, can notify a third customer device to pay a third portion of the bill, or, if the next customer device does not have a bill paying function, transfer the remainder of the bill back to the merchant device for processing.

Figure 6:
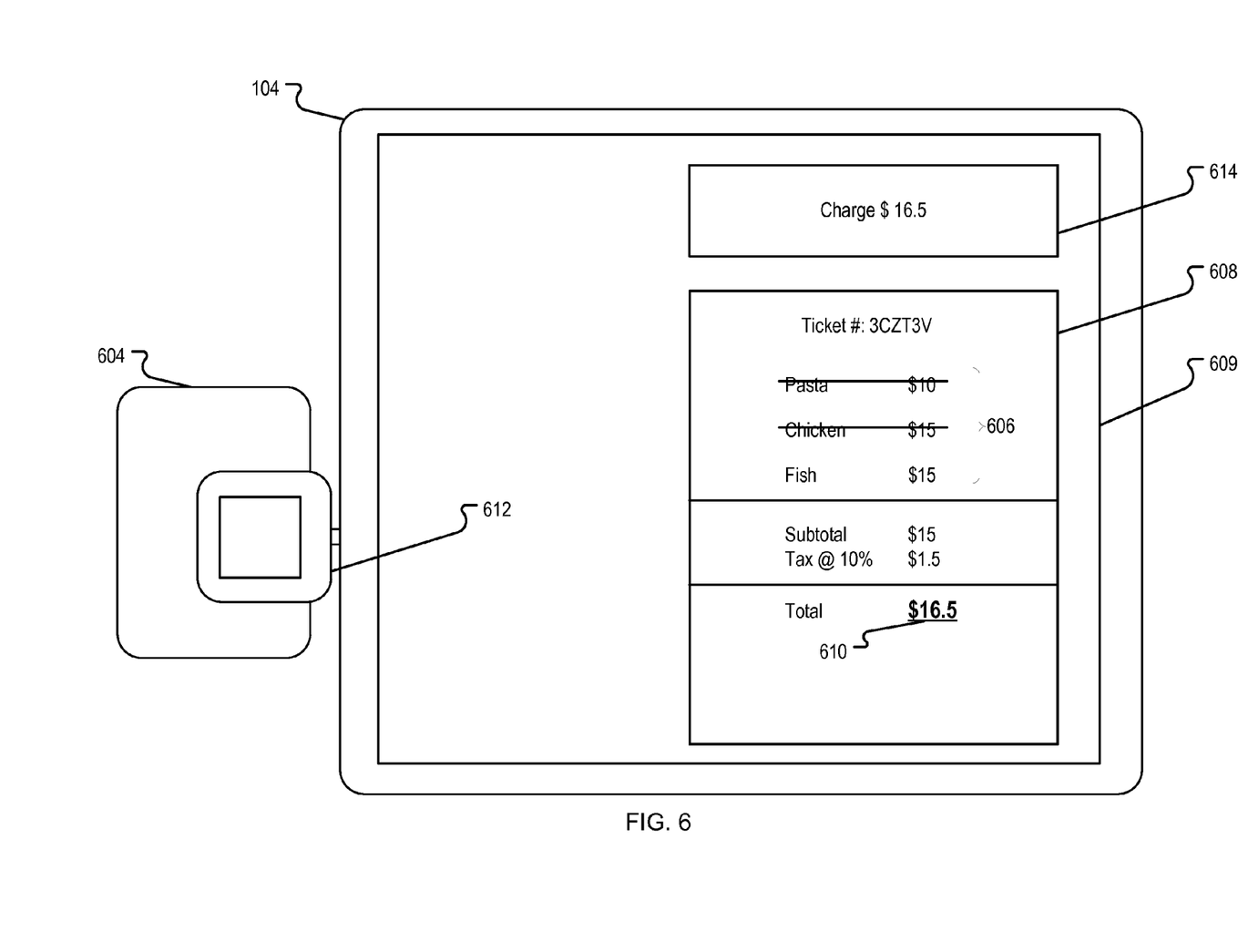
FIG. 6 illustrates an example user interface of a merchant device processing a remainder portion of a bill.

FIG. 6 illustrates an example user interface of a merchant device processing a remainder portion of a bill. The next customer device, customer device 102c, may not have a digital wallet application for paying a portion of a bill, e.g., bill 202. A merchant device 104 can process payment of the portion of the bill for the third customer. The merchant device 104 can receive payment of remainder of the bill from a payment card 604. The payment card can be a credit card, a debit card, a store loyalty card, a gift card, or a smart card.

The merchant device 104 receives information from the customer device 102b, or from a financial institution, that a portion of a bill associated with a transaction has already been paid. The merchant device 104 displays items list 606 in a bill processing interface 608 on a display screen 609 of the merchant device 104. In item list 606, the items that have already been paid for by the customer device 102a and the customer device 102b can be marked, e.g., using a crossed out or greyed out font. The merchant device 104 can display a remainder amount 610, which is total amount of the bill of the transaction less already paid amounts.

The merchant device 104 can include, or be coupled to, a card reader 612. The card reader 612 is a device including one or more read heads configured to read information stored in a magnetic stripe of the payment card 604 when the payment card 604 swipes across the card reader 612. The information can include authentication information.

Upon reading the authentication information, the merchant device 104 can display a card processing interface item 614. The card processing interface item 614 can receive a user input for processing payment from payment card 604. Upon receiving the input, the merchant device 104 can complete the payment, including paying the remainder of the bill for the transaction by reading the credit card using the credit card reader. Accordingly, a bill, e.g., bill 202 of FIG. 2, is split among the customers A, B, and C, who use the customer devices 102a, 102b, and 102c, respectively.

Figure 7:
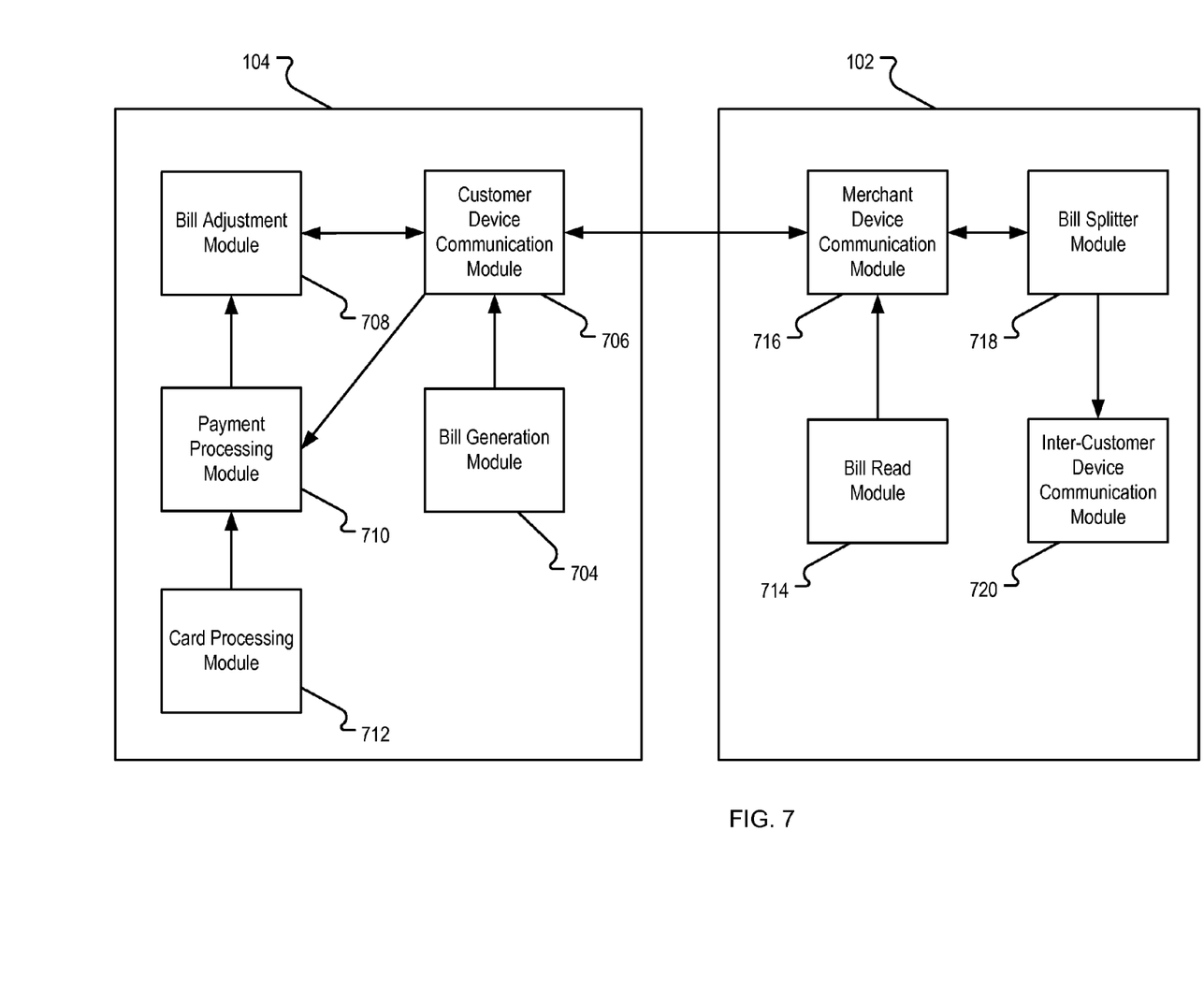
FIG. 7 is a block diagram illustrates components of a system for splitting bills.

FIG. 7 is a block diagram illustrates components of a system for splitting bills. The system can include a merchant device 104 and one or more customer devices 102. Each of the merchant device 104 and customer device 102 can include one or more processors and a storage device storing instructions operable to cause the one or more processors to perform bill splitting operations.

The merchant device 104 includes a bill generation module 704. The bill generation module 704 is a component of the merchant device 104 operable to receive input from a merchant or merchant employee specifying goods or services purchased in a transaction and a price of each item of the goods or services. The bill generation module 704 then generates a bill, e.g., the bill 202 of FIG. 2. The bill can have an identifier of a transaction in which the items are bought. The bill generation module 704 can print out a paper bill, display the bill on a display device, or submit the bill to the customer device 102 through a customer device communication module 706.

The customer device communication module 706 is a component of the merchant device 104 configured to communicate with the customer device 102 through a wired or wireless connection. The customer device communication module 706 can receive a request from the customer device 102. The request can include the identifier of the transaction. In response, the customer device communication module 706 can provide details of the bill to the requesting device. The customer device communication module 706 can receive a request from the customer device 102 to pay a portion of the bill. The request can include an identifier, e.g., name or item number, of an item to be paid for and an amount to be paid. In response, the customer device communication module 706 can inform a bill adjustment module 708 and submit the payment to payment processing module 710.

The payment processing module 710 is a component of the merchant device 104 configured to communicate with a card payment network, e.g., the card payment network 116 of FIG. 1, to process payment received from the customer device communication module 706. Once the payment is approved, the payment processing module 710 informs the bill adjustment module 708.

The bill adjustment module 708 is a component of the merchant device 104 configured to adjust the bill generated by the bill generation module 704 upon receiving notifications from the customer device communication module 706 and the payment processing module 710. The bill adjustment module 708 adjusts the bill by deducting the amount paid from the bill, and designating one or more items as already paid for.

The customer device communication module 706, upon receiving another request from a different customer device 102, e.g., one operated by another customer, can provide the adjusted bill to the different customer device 102. The customer device communication module 706 can receive a second payment. The process can continue until the customer device communication module 706 no longer receives request from a customer device requesting information for a same transaction.

The merchant device 104 can include a card processing module 712. The card processing module 712 is a component of the merchant device 104 configured to accommodate bill splitting where a party splitting the bill does not have a digital wallet application. The card processing module 712 can receive payment from a payment card, and apply to the payment to a transaction. The card processing module 712 can submit the payment to the payment processing module 710 for further processing.

The customer device 102 includes a bill read module 714. The bill read module 714 is a component of the customer device 102 configured to read a bill, e.g., by scanning a printed bill or a displayed bill and determine content of the bill, if the content of the bill is encoded in a barcode representation or is recognizable by a text recognition system. If detailed content is not retrieved from the scan, the bill read module 714 can determine a transaction identifier and request more detailed information of the bill from the merchant device 104 through a merchant device communication module 716.

The merchant device communication module 716 is a component of the customer device 102 configured to communicate with the customer device communication module 706 of the merchant device 104 to request bill information or to submit a portion of the payment. The merchant device communication module 716, like the customer device communication module 706, can include hardware and software for conducting wired or wireless communications.

The merchant device communication module 716 can submit the detailed information received by the merchant device communication module 716 from the customer device communication module 706 to a bill splitter module 718. The bill splitter module 718 is a component of the customer device 102 configured to display items, or remaining items, of the bill, receive a user input selecting items for payment, and submit the payment to a payment subsystem of the customer device 102. The bill splitter module 718 can notify the merchant device 104, through the merchant device communication module 716, the item and amount paid, such that the merchant device 104 can adjust the bills.

In some implementations, the bill splitter module 718 can notify other customer devices of the payment through inter-customer device communication module 720. The inter-customer device communication module 720 is a component of the customer device 102 configured to provide a bill, or a remainder of a bill after the customer device 102 makes a payment, to another other customer device, such that the other customer device can make a payment on the remainder of the bill.

Figure 8:
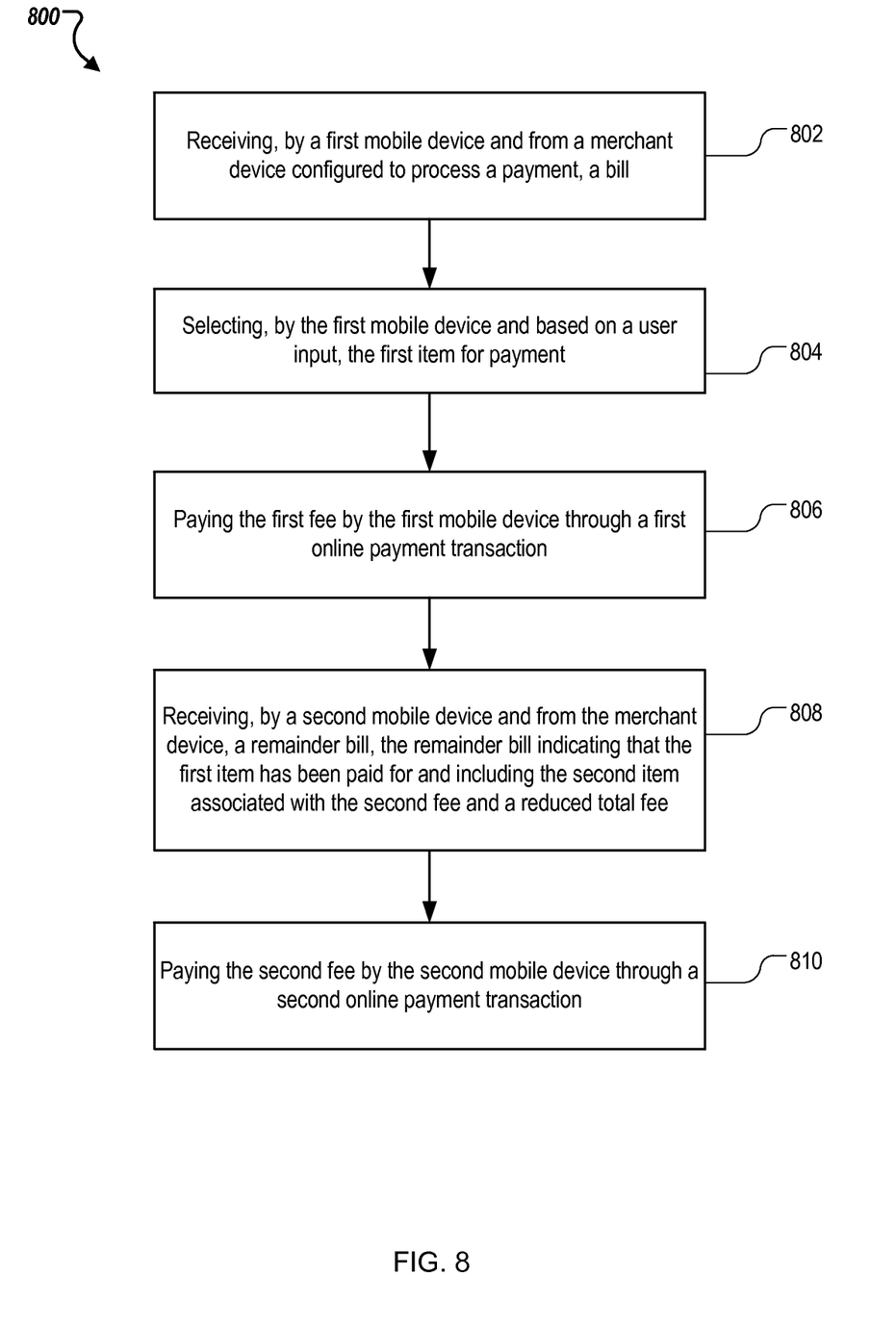
FIG. 8 is a flowchart of an example process of splitting a bill among multiple customer devices.

FIG. 8 is a flowchart of an example process 800 of splitting a bill among multiple customer devices. The customer devices, e.g., customer devices 102a and 102b of FIG. 1, can be mobile devices.

A first mobile device, e.g., the customer device 102a, receives (802), from a merchant device, e.g., the merchant device 104 of FIG. 1, configured to process a payment, a bill. The bill includes a list representing a first item associated with a first fee, a second item associated with a second fee, and a total fee. In addition, the bill can include an identifier of the transaction. The identifier can be encoded as two-dimensional barcode.

The first mobile device scans the bill and receives the list of items and fees, either directly from the scan or from the merchant device using the identifier. The first mobile device selects (804), based on a user input, the first item for payment. The user input can be a touch screen input selecting the first item from the list.

The first mobile device pays (806) the first fee through a first online payment transaction. In addition, the first mobile device communicates with the merchant device and informs the merchant device that the first item has been paid for.

A second mobile device, e.g., customer device 102b, receives (808), from the merchant device or from the first mobile device, a remainder bill. The remainder bill indicates that the first item has been paid for and includes the second item associated with the second fee and a reduced total fee. The second mobile device displays the remainder bill in an interactive list. In addition, the second mobile device provides a visual indication, e.g., a crossed-out font, that the first item has been paid for.

The second mobile device receives a user selection to pay for the second item and then, in response, pays (810) the second fee through a second online payment transaction. The second mobile device communicates with the merchant device and informs the merchant device that the second item has been paid for.

Figure 9:
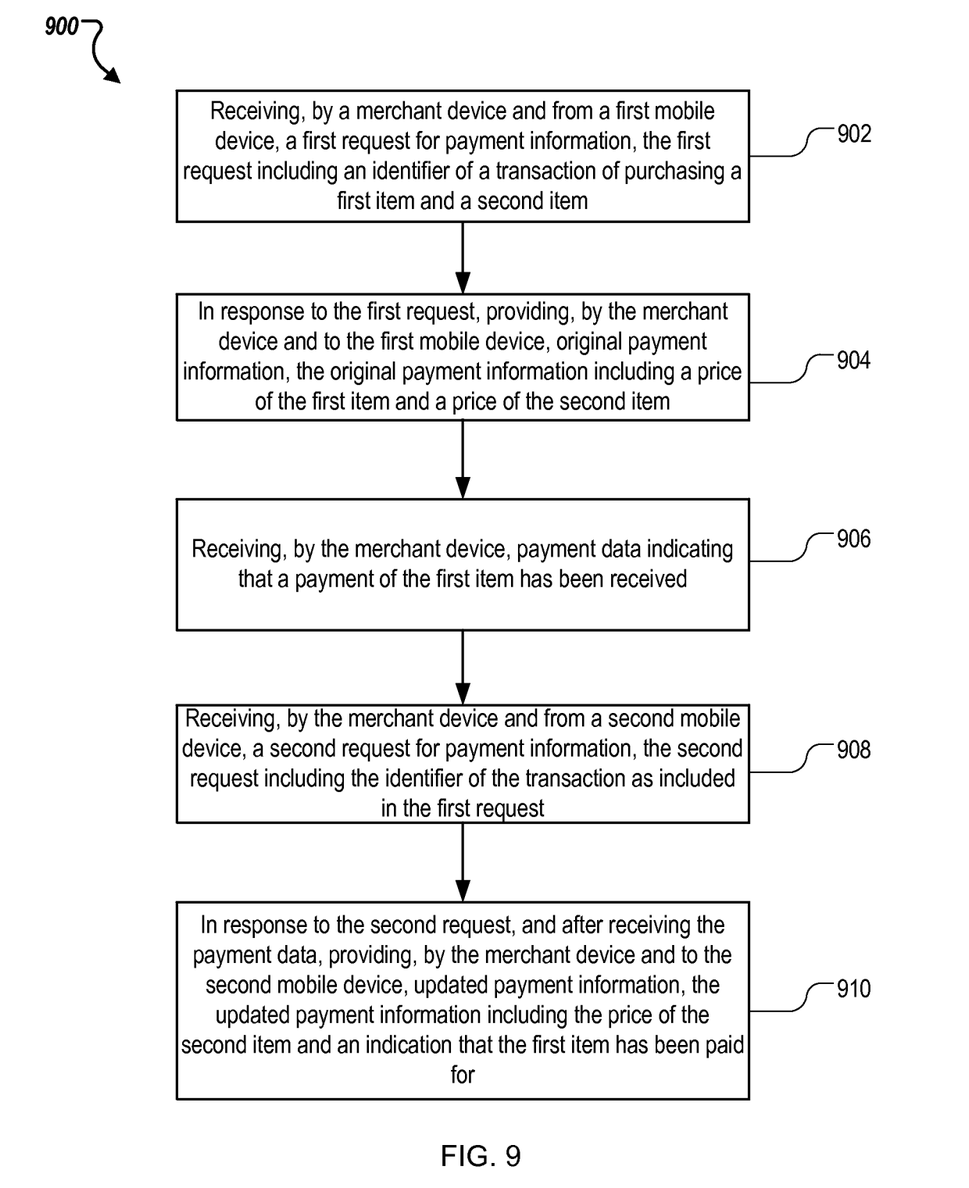
FIG. 9 is a flowchart of an example process of splitting a bill performed by a merchant device.

FIG. 9 is a flowchart of an example process 900 of splitting a bill performed by a merchant device. The merchant device can be the merchant device 104 of FIG. 1.

The merchant device can provide a bill. The bill includes a list of a first item associated with a first fee and a second item associated with a second fee. The bill also includes a representation of an identifier of a transaction of purchasing a first item and a second item. The representation of the identifier of the transaction can include a two-dimensional barcode. The merchant device can present the identifier in a printed for scanning, or display the identifier on a displayed bill for scanning.

A first mobile e.g., customer device 102a of FIG. 2, can scan the bill and retrieve the identifier. The first mobile device then submits to the merchant device a request for detailed bill information. The merchant device receives (902), from a first mobile device, a first request for payment information. The first request includes the identifier of the transaction.

In response to the first request, the merchant device provides (904), to the first mobile device, original payment information. The original payment information includes a price of the first item and a price of the second item.

The first customer device then pays a portion of the transaction. For example, the first customer device can pay for the first item and then notify the merchant device that a payment has been made by sending payment data to the merchant device. The merchant device receives (906) the payment data indicating that a payment of the first item has been received.

A second mobile device, e.g., customer device 102b of FIG. 2, then scans the bill and submits a second request, after the first request by the first customer device, for detailed bill information to the merchant device. The merchant device receives (908), from the second mobile device, the second request for payment information. The second request includes the identifier of the transaction as included in the first request.

In response to the second request, and after receiving the payment data, the merchant device provides (910) to the second mobile device updated payment information. The updated payment information includes the price of the second item and an indication that the first item has been paid for. The indication that the first item has been paid for includes a name of the first item and a price of the first item. The name and price can be represented in a crossed-out or greyed-out font.

The transaction can include a purchase of a third item. The merchant device can receive a user input requesting to pay remaining costs of the transaction. In response, the merchant device can provide for display a bill indicating that the first item and the second item have been paid for and indicating a fee for the third item.

In some implementations, a merchant device generates a bill for a sales transaction. The bill includes a list representing a first item associated with a first fee, a second item associated with a second fee, a total fee, and an identifier of the sales transaction. The identifier can be encoded in a barcode printed on the bill. The barcode can be a two-dimensional matrix bar code.

A first customer device can determine the identifier for paying the bill. For example, the first customer device can scan the barcode on the bill and recognize the identifier from the barcode.

The first customer device can receive a user input selecting the first item for payment and, in response, pay for the first item through a first online transaction.

The first customer device then notifies a second customer device that the first item on the bill has been paid for and payment for the second item is pending. Notifying the second customer device can include notifying the second customer device through a communication channel linking the first customer device and the second customer device. Notifying the second customer device can include providing a link to the merchant device and the identifier to the second customer device. The first customer device can request the second customer device to communicate with the merchant device. Notifying the second customer device can include requesting the second customer device to scan the barcode on the bill.

The second customer device can receive a user input selecting the second item for payment and, in response, paying for the second item through a second online transaction.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    generating, by a merchant device, a bill for a sales transaction, the bill including a list representing a first item associated with a first fee, a second item associated with a second fee, and a total fee, wherein a barcode printed on the bill encodes an indication of the first item, an indication of the first fee, an indication of the second item, an indication of the second fee, and an indication of the total fee;
    scanning, by a first customer device, the barcode on the bill to identify the indication of the first item, the indication of the first fee, the indication of the second item, the indication of the second fee, and the indication of the total fee;
    displaying, on the first customer device, the indication of the first item, the indication of the first fee, the indication of the second item, the indication of the second fee, and the indication of the total fee;
    receiving, by the first customer device, a user input selecting the first item for payment and, in response, paying for the first item through a first online transaction;
    notifying, by the first customer device, a second customer device that the first item on the bill has been paid for and payment for the second item is pending, wherein notifying the second customer device includes at least one of:
        notifying the second customer device through a communication channel linking the first customer device and the second customer device;
        notifying the second customer device by providing a link to the merchant device to the second customer device and requesting the second customer device to communicate with the merchant device; or
        requesting the second customer device to scan the barcode on the bill; and
    receiving, by the second customer device, a user input selecting the second item for payment and, in response, paying for the second item through a second online transaction.

2. The method of claim 1, wherein the barcode is a matrix barcode.

3. A method comprising:
    scanning, by a first mobile device, an image printed on a bill, the image encoding an indication of a first item associated with a first fee, an indication of a second item associated with a second fee, and an indication of a total fee;
    displaying, on the first mobile device, the indication of the first item and the first fee, the indication of the second item and the second fee, and the indication of the total fee;
    selecting, by the first mobile device and based on a user input, the first item for payment;
    paying the first fee by the first mobile device through a first online payment transaction;
    receiving, by a second mobile device, a remainder bill, the remainder bill indicating that the first item has been paid for and including the second item associated with the second fee and a reduced total fee; and
    paying the second fee by the second mobile device through a second online payment transaction.

4. The method of claim 3, wherein the image includes a two dimensional barcode.

5. The method of claim 3, wherein the second mobile device provides a visual indication that the first item has been paid for.

6. A method comprising:
    receiving, by a merchant device of a merchant and from a first mobile device that scanned an image printed on a bill provided by the merchant, a first request for payment information, the first request including an identifier of a transaction of purchasing a first item and a second item, the identifier encoded in the image printed on the bill;
    in response to the first request, providing, by the merchant device and to the first mobile device, original payment information, the original payment information including a price of the first item and a price of the second item;

receiving, by the merchant device, payment data indicating that a payment of the first item has been received;

receiving, by the merchant device and from a second mobile device that scanned the image printed on the bill, a second request for payment information, the second request including the identifier of the transaction as included in the first request; and in response to the second request, and after receiving the payment data, providing, by the merchant device and to the second mobile device, updated payment information, the updated payment information including the price of the second item and an indication that the first item has been paid for.

7. The method of claim 6, comprising, before receiving the first request, providing, by the merchant device, the bill, the bill including:

a list of the first item associated with a first fee and the second item associated with a second fee; and the image in which the identifier of the transaction is encoded.

8. The method of claim 7, wherein the image includes a two-dimensional barcode scannable by the first mobile device and the second mobile device.

9. The method of claim 6, comprising, before receiving the first request and the second request, providing the bill including the image printed thereon for scanning by the first mobile device.

10. The method of claim 6, wherein the indication that the first item has been paid for includes a name of the first item and the price of the first item, the name and price being represented in a crossed-out font.

11. The method of claim 6, wherein the transaction includes a purchase of a third item, and the method comprises:

receiving, by the merchant device, a user input requesting to pay remaining costs of the transaction; and in response, providing, by the merchant device, the bill, updated to indicate that the first item and the second item have been paid for and indicating a fee for the third item.

12. A non-transitory storage device storing instructions operable to cause a merchant device of a merchant to perform operations comprising:

receiving, by the merchant device and from a first mobile device that scanned an image printed on a bill provided by the merchant, a first request for payment information, the first request including an identifier of a transaction of purchasing a first item and a second item, the identifier encoded in the image printed on the bill;

in response to the first request, providing, by the merchant device and to the first mobile device, original payment information, the original payment information including a price of the first item and a price of the second item;

receiving, by the merchant device, payment data indicating that a payment of the first item has been received;

receiving, by the merchant device and from a second mobile device that scanned the image printed on the bill, a second request for payment information, the second request including the identifier of the transaction as included in the first request; and in response to the second request, and after receiving the payment data, providing, by the merchant device and to the second mobile device, updated payment information, the updated payment information including the price of the second item and an indication that the first item has been paid for.

13. The non-transitory storage device of claim 12, the operations comprising, before receiving the first request, providing, by the merchant device, the bill, the bill including:

a list of the first item associated with a first fee and the second item associated with a second fee; and the image in which the identifier of the transaction is encoded.

14. The non-transitory storage device of claim 13, wherein the image includes a two-dimensional barcode scannable by the first mobile device and the second mobile device.

15. The non-transitory storage device of claim 12, the operations comprising, before receiving the first request and the second request, providing the bill including the image printed thereon for scanning by the first mobile device.

16. The non-transitory storage device of claim 12, wherein the indication that the first item has been paid for includes a name of the first item and the price of the first item, the name and price being represented in a crossed-out font.

17. The non-transitory storage device of claim 12, wherein the transaction includes a purchase of a third item, and the operations comprise:

receiving, by the merchant device, a user input requesting to pay remaining costs of the transaction; and in response, providing, by the merchant device, the bill, updated to indicate that the first item and the second item have been paid for and indicating a fee for the third item.

18. A merchant device of a merchant, the merchant device comprising:

one or more computers; and a non-transitory storage device storing instructions operable to cause the one or more computers to perform operations comprising:

receiving, by the merchant device and from a first mobile device that scanned an image printed on a bill provided by the merchant, a first request for payment information, the first request including an identifier of a transaction of purchasing a first item and a second item, the identifier encoded in the image printed on the bill;

in response to the first request, providing, by the merchant device and to the first mobile device, original payment information, the original payment information including a price of the first item and a price of the second item;

receiving, by the merchant device, payment data indicating that a payment of the first item has been received;

receiving, by the merchant device and from a second mobile device that scanned the image printed on the bill, a second request for payment information, the second request including the identifier of the transaction as included in the first request; and in response to the second request, and after receiving the payment data, providing, by the merchant device and to the second mobile device, updated payment information, the updated payment information including the price of the second item and an indication that the first item has been paid for.

19. The merchant device of claim 18, the operations comprising, before receiving the first request, providing, by the merchant device, the bill, the bill including:

a list of the first item associated with a first fee and the second item associated with a second fee; and the image in which the identifier of the transaction is encoded.

20. The merchant device of claim 19, wherein the image of the transaction includes a two-dimensional barcode scannable by the first mobile device and the second mobile device.

21. The merchant device of claim 18, the operations comprising, before receiving the first request and the second request, providing the bill including the image printed thereon for scanning by the first mobile device.

22. The merchant device of claim 18, wherein the indication that the first item has been paid for includes a name of the first item and the price of the first item, the name and price being represented in a crossed-out font.

23. The merchant device of claim 18, wherein the transaction includes a purchase of a third item, and the operations comprise:
    receiving, by the merchant device, a user input requesting to pay remaining costs of the transaction; and
    in response, providing, by the merchant device, the bill, updated to indicate that the first item and the second item have been paid for and indicating a fee for the third item.

24. A non-transitory storage device storing instructions operable to one or more mobile devices to perform operations comprising:
    scanning, by a first mobile device, an image printed on a bill, the image encoding an indication of a first item associated with a first fee, an indication of a second item associated with a second fee, and an indication of a total fee;
    displaying, on the first mobile device, the indication of the first item and the first fee, the indication of the second item and the second fee, and the indication of the total fee;
    selecting, by the first mobile device and based on a user input, the first item for payment;
    paying the first fee by the first mobile device through a first online payment transaction;
    receiving, by a second mobile device, a remainder bill, the remainder bill indicating that the first item has been paid for and including the second item associated with the second fee and a reduced total fee; and
    paying the second fee by the second mobile device through a second online payment transaction.

25. The non-transitory storage device of claim 24, wherein the image includes a two dimensional barcode.

26. The non-transitory storage device of claim 24, wherein the second mobile device provides a visual indication that the first item has been paid for.

27. A system comprising:
    a merchant device; and
    one or more mobile devices configured to perform operations comprising:
        scanning, by a first mobile device, an image printed on a bill, the image encoding an indication of a first item associated with a first fee, an indication of a second item associated with a second fee, and an indication of a total fee;
        displaying, on the first mobile device, the indication of the first item and the first fee, the indication of the second item and the second fee, and the indication of the total fee;
        selecting, by the first mobile device and based on a user input, the first item for payment;
        paying the first fee by the first mobile device through a first online payment transaction;
        receiving, by a second mobile device, a remainder bill, the remainder bill indicating that the first item has been paid for and including the second item associated with the second fee and a reduced total fee; and
        paying the second fee by the second mobile device through a second online payment transaction.

28. The system of claim 27, wherein the image includes a two dimensional barcode.

29. The system of claim 27, wherein the second mobile device provides a visual indication that the first item has been paid for.

* * * * *